United States Patent
Mayersak

Patent Number: 5,456,429
Date of Patent: Oct. 10, 1995

[54] THRUST MANEUVER SYSTEM

[75] Inventor: Joseph R. Mayersak, Ashburn, Va.

[73] Assignee: Loral Corp., Yonkers, N.Y.

[21] Appl. No.: 100,268

[22] Filed: Aug. 2, 1993

[51] Int. Cl.$^6$ .............. F42B 10/66; B64G 1/26; B64B 1/36
[52] U.S. Cl. .......... 244/765; 244/3.22; 244/3.23; 244/52; 244/169; 244/74
[58] Field of Search .................. 244/73 R, 74, 244/164, 52, 765, 3.22, 3.23, 3.29

[56] References Cited

U.S. PATENT DOCUMENTS

| | | |
|---|---|---|
| 3,339,864 | 9/1967 | Whitson ......................... 244/1 |
| 3,558,078 | 1/1971 | Lanzaro ....................... 344/169 |
| 3,593,381 | 12/1970 | Shaw et al. ................... 244/77 |
| 3,643,897 | 2/1972 | Johnson, Jr. .................. 244/169 |
| 3,926,390 | 12/1975 | Teuber et al. ................. 244/3.22 |
| 3,944,172 | 3/1976 | Becker ......................... 244/169 |
| 4,370,716 | 1/1983 | Amieux ........................ 244/3.22 |
| 4,463,921 | 8/1984 | Metz ........................... 244/3.22 |
| 4,550,888 | 11/1985 | Douglass et al. ............... 244/3.22 |
| 4,599,697 | 7/1986 | Chan et al. ................... 364/434 |
| 4,630,790 | 12/1986 | Williams, Jr. ................. 244/169 |
| 4,635,885 | 1/1987 | Hujsak ......................... 244/169 |
| 4,758,957 | 7/1988 | Hubert ........................ 244/169 |
| 4,848,706 | 7/1989 | Goug et al. ................... 244/169 |
| 4,928,906 | 5/1990 | Sturm .......................... 244/3.22 |
| 4,947,096 | 8/1990 | Snow ......................... 244/76 J |
| 4,958,788 | 9/1990 | Namera et al. ................. 244/169 |
| 5,020,746 | 6/1991 | Auzel .......................... 244/169 |
| 5,172,876 | 12/1992 | Raltn ........................... 244/169 |
| 5,294,079 | 3/1994 | Draznin et al. ................. 244/169 |
| 5,310,143 | 5/1994 | Yocum et al. .................. 244/169 |
| 5,318,256 | 6/1994 | Applebury ..................... 244/169 |

FOREIGN PATENT DOCUMENTS

| | | |
|---|---|---|
| 544295A | 6/1993 | European Pat. Off. ........... 244/169 |
| 3311499 | 12/1992 | Germany ...................... 244/169 |
| 4257800 | 9/1992 | Japan ......................... 2449 169 |

Primary Examiner—Andres Kashnikow
Assistant Examiner—Virna Lissi Mojica
Attorney, Agent, or Firm—Charles E. Temko

[57] ABSTRACT

A thrust maneuver system for steerable vehicles comprising a plurality of thrusters of varying impulsive force, some of which provide a base force, and others varying multiples of the base force. The forces may be used additively or subtractively to obtain a desired force for any given maneuver.

5 Claims, 2 Drawing Sheets

THRUST MANEUVER SYSTEM

BACKGROUND OF THE INVENTION

This invention relates generally to the field of maneuverable vehicles, and more particularly to an improved positioning system for such vehicles.

A problem continuously faced by individuals involved in the design or operation of devices that must be maneuverable is how to precisely position these devices within the constraints of cost and complexity. Numerous instances in which this problem arises can be cited. They range from the shutting of a door to the positioning of a satellite in space, to the guidance of a missile in mid-flight.

One method of achieving this micro-positioning is through the use of a fixed opposable force based system. Such a system will usually be comprised of a large number of thrusters fixed to the body of the maneuverable device. Combinations of these thrusters can then be fired to effect the desired maneuver. Two weapon systems that use this maneuver method are the U.S. Army Hypervelocity missile and the Command Adjusted Trajectory Projectile.

There are several drawbacks to these thruster based systems. For most applications, a large number of thrusters is needed. If the available external space on the body of the device, where the thrusters can be mounted, is small, then either another positioning method must be used or larger thrusters must be used. If larger thrusters are used, the resolution of the system will decline. Cost is also a limiting factor. As more thrusters are necessary to effect a desired force, cost could become prohibitive. However, these drawbacks do not have to prevent the use of thruster based systems. The thruster concept can be modified to achieve the same results using substantially fewer thrusters. As a byproduct, a much lower cost is also achieved.

SUMMARY OF THE INVENTION

Briefly stated, the present invention contemplates the provision of an improved maneuver system for vehicles, in which the above-mentioned disadvantages have been substantially ameliorated. The present invention employs constant impulse thrusters of different strengths, applied at either fixed or variable times to effect desired maneuvers.

Rather than the familiar on/off devices normally associated with thrusters, the present invention makes use of single shot thrusters. These devices are able to generate an impulsive force just once before they are spent. It is this attribute which allows for the low cost associated with the maneuver concept. These single shot devices, when compared to the cost of control fins or on/off thrusters, are very inexpensive.

Applications for this new concept are both numerous and varied. It can be used wherever there is a need for very accurate positioning. This includes effecting maneuvers for guided missiles, artillery shells, and space vehicles. It can be used for steering, for providing lateral thrust, and, if mounted in such a way to direct the thrust to the front and rear, for controlled acceleration and deceleration. Furthermore, this concept can be adapted for use with hydraulic pistons, electromotive devices, and control systems where the control quantity is discrete. The invention can be characterized as a variable maneuver, variable force maneuver concept. Variable maneuver because it can be used to generate a series of different maneuvers. Variable force because each thruster is of a different strength.

BRIEF DESCRIPTION OF THE DRAWINGS

In the drawings, to which reference will be made in the specification.

DETAILED DESCRIPTION OF THE DISCLOSED EMBODIMENTS

Figure 1:
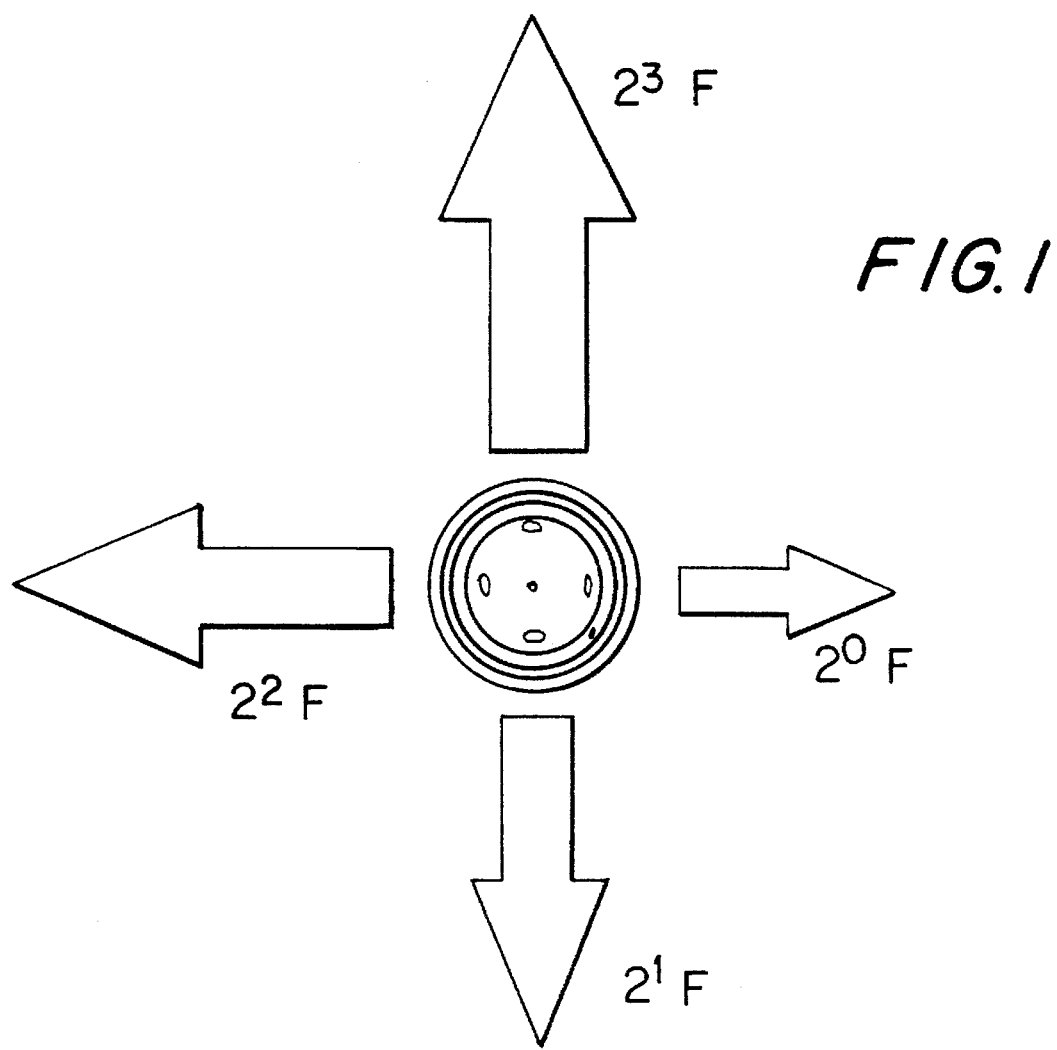
FIG. 1 is a schematic end elevational view of an embodiment of the invention.

In accordance with the invention, the thrusters used in the disclosed maneuver system are based on a base-M strength concept. For the purpose of description, the base-2 system will be used. For the base-2 maneuver system the thrusters are scaled on a base-2 thruster strength concept. Each thruster generates a different impulsive force, related through a base-2 number system, to effect a maneuver on the system. Using this concept, four thrusters can be used to generate all forces up to 15 times the base force. This operates as follows: The base force is designated F. There is one thruster each of forces $2^0F$ or $1F$, $2^1F$, or $2F$, $2^2F$, or $4F$, and $2^3F$ or $8F$. These thrusters, geometrically situated on the sides of the device, can effect any force from 0F to 15F by firing the thrusters in specific combinations of direction and strength. FIG. 1 illustrates how this concept can be applied to a missile. The thruster firing combinations needed to generate all forces up to 15F are presented in Table 1.

TABLE 1

| | Base-2 Thruster Force Combinations | | | |
|---|---|---|---|---|
| Force | $2^0F$ | $2^1F$ | $2^2F$ | $2^3F$ |
| 1F | +1F | | | |
| 2F | | +2F | | |
| 3F | +1F | +2F | | |
| 4F | | | +4F | |
| 5F | +1F | | +4F | |
| 6F | | +2F | +4F | |
| 7F | +1F | +2F | +4F | |
| 8F | | | | +8F |
| 9F | +1F | | | +8F |
| 10F | | +2F | | +8F |
| 11F | +1F | +2F | | +8F |
| 12F | | | +4F | +8F |
| 13F | +1F | | +4F | +8F |
| 14F | | +2F | +4F | +8F |
| 15F | +1F | +2F | +4F | +8F |

To further illustrate the present maneuver system, an example scaled on a base-3 thruster strength concept is also presented. For this system, the thrusters are related through a base-3 number system. Four thrusters can generate any force up to 40F. This is accomplished with one each of the following thrusters $3^0F$ or $1F$, $3^1F$ or $3F$, $3^2F$ or $9F$, and $3^3F$ or $27F$. Table 2 presents the force combinations for a base-3 system with four thrusters.

TABLE 2

| | Base-3 Thruster Force Combinations | | | |
|---|---|---|---|---|
| Force | $3^0F$ | $3^1F$ | $3^2F$ | $3^3F$ |
| 1F | +1F | | | |

TABLE 2-continued

| | Base-3 Thruster Force Combinations | | | |
|---|---|---|---|---|
| Force | $3^0F$ | $3^1F$ | $3^2F$ | $3^3F$ |
| 2F | −1F | +3F | | |
| 3F | | +3F | | |
| 4F | +1F | +3F | | |
| 5F | −1F | −3F | +9F | |
| 6F | | −3F | +9F | |
| 7F | +1F | −3F | +9F | |
| 8F | −1F | | +9F | |
| 9F | | | +9F | |
| 10F | +1F | | +9F | |
| 11F | −1F | +3F | +9F | |
| 12F | | +3F | +9F | |
| 13F | +1F | +3F | +9F | |
| 14F | −1F | −3F | −9F | +27F |
| 15F | | −3F | −9F | +27F |
| 16F | +1F | −3F | −9F | +27F |
| 17F | −1F | | −9F | +27F |
| 18F | | | −9F | +27F |
| 19F | +1F | | −9F | +27F |
| 20F | −1F | +3F | −9F | +27F |
| 21F | | +3F | −9F | +27F |
| 22F | +1F | +3F | −9F | +27F |
| 23F | −1F | −3F | | +27F |
| 24F | | −3F | | +27F |
| 25F | +1F | −3F | | +27F |
| 26F | −1F | | | +27F |
| 27F | | | | +27F |
| 28F | +1F | | | +27F |
| 29F | −1F | +3F | | +27F |
| 30F | | +3F | | +27F |
| 31F | +1F | +3F | | +27F |
| 32F | −1F | −3F | +9F | +27F |
| 33F | | −3F | +9F | +27F |
| 34F | +1F | −3F | +9F | +27F |
| 35F | −1F | | +9F | +27F |
| 36F | | | +9F | +27F |
| 37F | +1F | | +9F | +27F |
| 38F | −1F | +3F | +9F | +27F |
| 39F | | +3F | +9F | +27F |
| 40F | +1F | +3F | +9F | +27F |

Upon consideration of Tables 1 and 2, it is apparent that in order to achieve several of the desired force levels, the thruster strengths are either added together or subtracted from one another. These operations refer to the direction in which the thruster is fired. When thrusters are added together it means that they fire in the same direction. Conversely, when thruster strengths are subtracted, they are fired in opposite directions. As an example, to achieve a maneuver force of 5F using the base-2 system, the 4F and the 1F thrusters are fired in the same direction. To achieve the same force using the base-3 system, the 9F thruster will be fired in one direction, and both the 1F and 3F thrusters will be fired in the opposite direction. The summation of all these forces totals 5F for each system.

Several observations can be made about the difference between the base-2 and the base-3 maneuver systems. First, for the same force, F, the base-3 system can produce a much greater tota force; 40F versus 15F for the base-2 system. Second, all forces in the base-2 system are additive. That is to say, the thrusters will always fire in the same direction.

Figure 2:
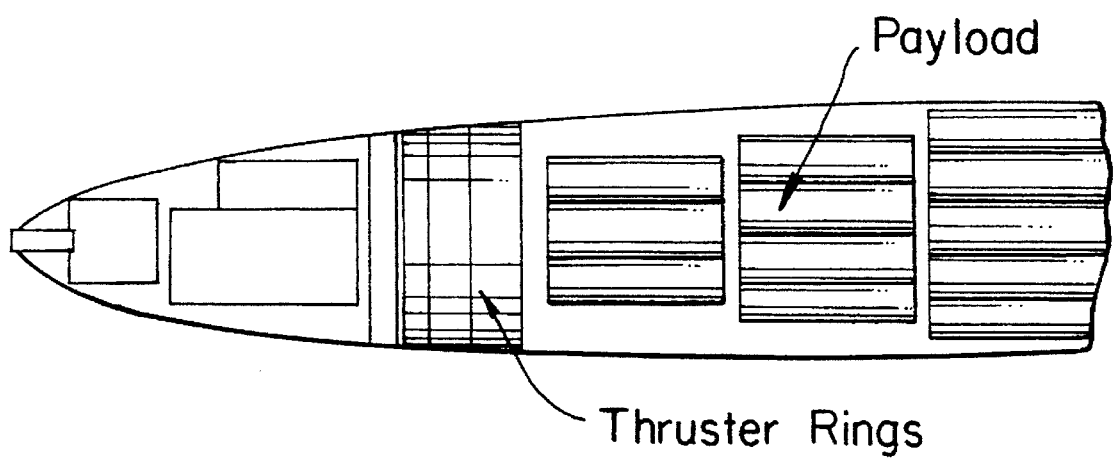
FIG. 2 is a longitudinal central sectional view thereof.
Figure 3:
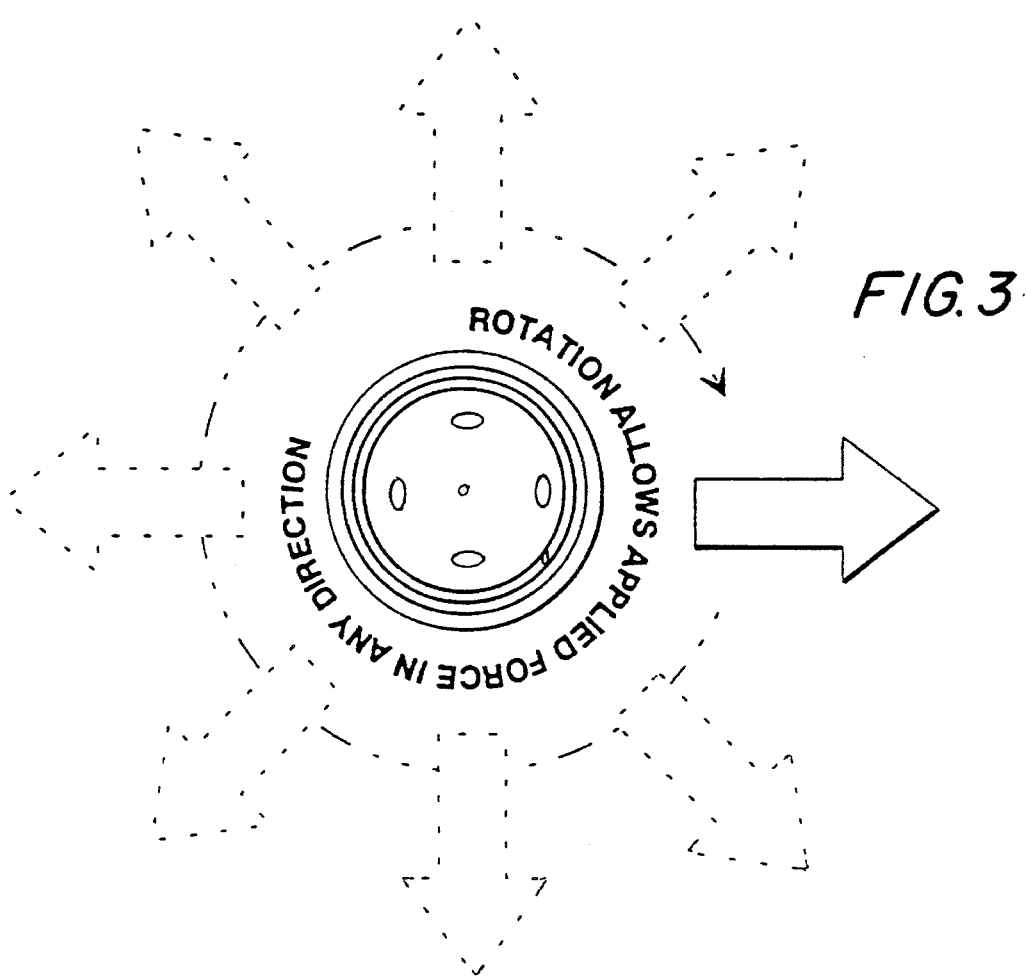
FIG. 3 is a schematic end elevational view thereof showing thruster rotation.

Due to the need for each thruster to be able to fire in any direction, the thrusters, in order to effect the desire maneuver, must have a way to move around the body axis of the device (See FIG. 2). This can be accomplished in one of two ways. Either the device must be rolling or spinning or it must be roll stabilized and equipped with a mechanical system to rotate or redirect the thrusters. Reference is made to U.S. Pat. No. 3,339,864 granted Sep. 5, 1967 to J. W. Whitson, the teaching of which is incorporated by reference. As each thruster rotates it will pass through all possible firing points. An onboard microprocessor, supplied with the current data relative to the state of the device (position, velocity, attitude, and angular velocity) and data relative to the desired state of the device, would direct each thruster to fire at precisely the correct time and position to execute the intended maneuver.

Figure 4:
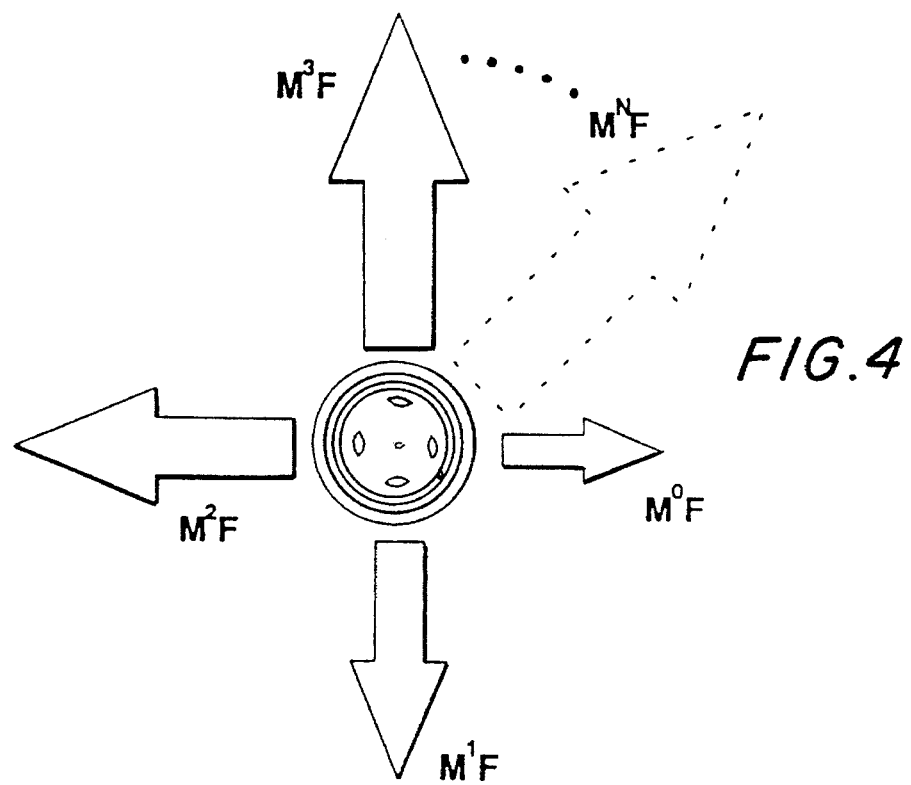
FIG. 4 is a schematic end elevational view thereof showing forces generated by individual thrusters.

The system may be described as an $M^NF$ maneuver scheme. F is the base force of the system. It is the smallest unit of force which can be exerted. M is the base number on which the maneuver scheme is based. This number will determine either how fine of a maneuver the system can accomplish for a given value of F, or how many thrusters need to be used to effect a desired total force. $M^N$ is the force generated by each individual thruster; where N is the set of integers 0, 1, 2, . . . , Total number of thrusters - 1. This general system is illustrated in FIG. 4.

One final point requires mention. As more thrusters are used, the resolution of the maneuver becomes finer for a given total force, i.e., the device can execute the maneuver in smaller steps. For example, if the maximum force needed is $40F_1$, where $F_1$ is the base force in a $3^N$ system based on four thrusters (system-1), then the same mission can be accomplished using a force of $121F_2$, where $F_2$ is the base force of a $3^N$ thruster system based on five thrusters (system-2). Since the total force needed is the same, setting $40F_1$ equal to $121F_2$ reveals that in this example $F_2$ is approximately one-third as large as $F_1$, therefore enabling system-2 to have a finer maneuver precision. By the same reasoning, if $F_2$ is equal in strength to $F_1$, then system-2 will have the same maneuver resolution as system-1, but it will be able to achieve maneuvers of greater magnitude.

An application of this property would be to have two thruster systems mounted on a guided weapon. The first system would be able to effect a coarse course correction while the weapon is a large distance from its target. The second system would be able to effect a fine course maneuver to pinpoint the target as the weapon closes in on it.

It may thus be seen that I have invented a novel and highly useful thrust maneuver system for vehicles which is considerably simpler than that of the prior art and particularly suited for use with any device which needs an inexpensive method of effecting precision positioning. It provides significant control force on the vehicle while using limited space. The cost of manufacture of such system, because of such simplicity, may be substantially less than that of prior art systems effecting a comparable result.

I wish it to be understood that I do not consider the invention to be limited to the specific examples disclosed in the specification, for obvious variants will occur to those skilled in the art to which the invention pertains.

I claim:

1. A thrust maneuver system for positioning a vehicle comprising: a plurality of individually operable single shot thrusters each positioned upon said vehicle to exert a contributing force in a predetermined direction; each of said thrusters having a force of predetermined strength such that a first thruster has a base force wherein said base force has a magnitude other than one, a second thruster has a force which is a predetermined multiple of said base force, and a third thruster which has a force which is a multiple of the force of said second thruster.

2. A thruster maneuver system in accordance with claim 1, including a fourth thruster having a force which is a multiple of the force of said third thruster.

3. A thruster maneuver system in accordance with claim in which said predetermined multiple is 2.

4. A thrust maneuver system in accordance with claim 1 in which said predetermined multiple is 3.

5. A thrust maneuver system in accordance with claim 4, in which at least some of the thrusters are arranged for operation in mutually opposed directions.

* * * * *